(12) United States Patent
Dye

(10) Patent No.: US 6,575,210 B1
(45) Date of Patent: Jun. 10, 2003

(54) APPARATUS AND METHOD OF PROCESSING LOGS

(75) Inventor: Karl J. Dye, Seattle, WA (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/935,008

(22) Filed: Aug. 22, 2001

(51) Int. Cl.[7] .................. A01G 23/08; A01G 23/095
(52) U.S. Cl. .................. 144/24.13; 144/4.1; 144/338; 144/343; 144/357; 144/382; 144/402
(58) Field of Search .................. 144/4.1, 24.13, 144/34.1, 335, 336, 338, 343, 357, 382, 402; 414/731, 732, 738

(56) References Cited

U.S. PATENT DOCUMENTS

| | | | | |
|---|---|---|---|---|
| 3,140,736 A | * | 7/1964 | Propst | 144/338 |
| 3,542,099 A | * | 11/1970 | Gibson | 144/338 |
| 3,554,249 A | * | 1/1971 | Arnelo | 144/357 |
| 3,590,760 A | | 7/1971 | Boyd et al. | |
| 3,618,647 A | | 11/1971 | Stuart, Jr. | |
| 3,623,521 A | | 11/1971 | Shields | |
| 3,763,905 A | | 10/1973 | Hamilton et al. | |
| 3,868,982 A | | 3/1975 | Kurelek et al. | |
| 3,882,910 A | | 5/1975 | Peltola et al. | |
| 3,905,407 A | | 9/1975 | Guy et al. | |
| 3,939,886 A | | 2/1976 | Tucek | |
| 4,124,047 A | | 11/1978 | Dressler et al. | |
| 4,250,935 A | * | 2/1981 | Helgesson et al. | 144/357 |
| 4,451,194 A | | 5/1984 | Keats | |
| 5,107,912 A | | 4/1992 | Cote et al. | |
| 5,628,354 A | | 5/1997 | Kingston | |
| 5,964,262 A | * | 10/1999 | Corley | 144/24.13 |

OTHER PUBLICATIONS

Caterpillar 325B, 330B Forest Machine 1997 aehq5211 (Apr. 1997).
Pierce Monoboom Delimber, PMD 3348 Delimbinator, Pierce Pacific Manufacturing, Inc.

* cited by examiner

Primary Examiner—W. Donald Bray
(74) Attorney, Agent, or Firm—James R Smith

(57) ABSTRACT

The present invention provides an apparatus and method of processing logs. The apparatus includes a linkage having a boom and a stick. The boom is adapted for attachment to a support platform. A delimbing assembly is connected to the boom, and a loading assembly is connected to the stick. The method includes the steps of picking up a log, delimbing the log, and placing the log into a desired position.

15 Claims, 2 Drawing Sheets

APPARATUS AND METHOD OF PROCESSING LOGS

TECHNICAL FIELD

The present invention relates generally to an apparatus and method of processing logs, and, more specifically, to an apparatus and method which provides for delimbing, cut-to-length, and log handling functions in a single assembly.

BACKGROUND

In the forestry industry, it is common practice for a logging operator to cut down trees by hand or using a harvester-type machine, transport the logs (logs is used herein to refer to felled trees) to a central processing/loading location using a forwarder or the like, delimb the logs with a delimbing machine or by hand, optionally cut the logs to length by hand or using a work machine, and load the whole or cut logs onto a truck or other transport using a log loader.

As is intuitively obvious, this sort of operation requires a great number of different work machines which must be purchased and maintained, necessitating a wide range of replacement parts be available. The machines also are frequently idle when the supply feed of logs is uneven, and a breakdown of one machine can cause the entire operation to stop entirely. All of the above may cause the logging operator to incur great expense and loss of productivity.

It is thus common in the art for work machines to perform more than one of the aforementioned functions, in an attempt to reduce the number of machines and operators needed for a successful logging operation. However, many of these combination machines are mechanically quite complicated and perform multiple jobs poorly in comparison to single-function machines, which has resulted in a tendency for logging operators to continue to use the single-function machines.

Such a combination machine is disclosed in U.S. Pat. No. 5,628,354, issued May 13, 1997 to Aloysius Kingston (hereafter referenced as '354). '354 relates to a tree delimbing and severing attachment, which is optionally mounted on the trailer of a forwarder. The '354 machine may be used to process felled trees at the felling location and to carry logs therefrom to a forest road and then the central processing/loading location. '354, however, may have the disadvantages of scattering the discard material about the logging site, requiring multiple grapple cycles to transfer the cut-to-length logs to the forwarder trailer, and requiring a highly skilled operator to maneuver and delimb the logs in the often tight confines of a felling location, among others.

Accordingly, the art has sought a method and apparatus of processing logs which: successfully and efficiently combines several logging work functions in one apparatus; allows for logs to be processed in a central location which may be chosen to eliminate spacial constraints; performs several operations without requiring multiple instances of handling/moving the same log; may be used in a timely and efficient manner; and is more economical to manufacture and use.

The present invention is directed to overcoming one or more of the problems as set forth above.

SUMMARY OF THE INVENTION

In an embodiment of the present invention, an apparatus for processing logs is provided. The apparatus includes a linkage having a boom and a stick. The boom is adapted for attachment to a support platform. A delimbing assembly is connected to the boom, and a loading assembly is connected to the stick.

In an embodiment of the present invention, a method of processing logs using a log processing apparatus is provided. The method includes the steps of picking up a log, delimbing the log, and placing the log into a desired position.

In an embodiment of the present invention, a work machine for processing and loading logs is provided. The work machine includes a body, an engine, propulsion means, an operator compartment, a linkage connected to the body, and a log processing assembly connected to at least one of the linkage and the body. The log processing assembly includes a delimbing portion and a loading portion.

In an embodiment of the present invention, a method of processing logs is provided. The method includes the steps of picking up a log with a loading assembly of a work machine and delimbing the log with a delimber of the work machine. The method also includes the steps of determining at least one of a total length value, a partial length value, and a girth value of the log with a measuring system of the work machine and determining a desired length or lengths of the log using at least one of the total length value, partial length value, and girth value of the log. The method also includes the steps of cutting the log to the desired length or lengths with one or more saws of the work machine and placing the length or lengths of the log in a predetermined position with the loading assembly of the work machine.

DETAILED DESCRIPTION

A preferred embodiment of the present invention provides an apparatus and method of processing logs. The following description uses an excavator as an example only. This invention may be applied to other types of work machines.

Figure 1:
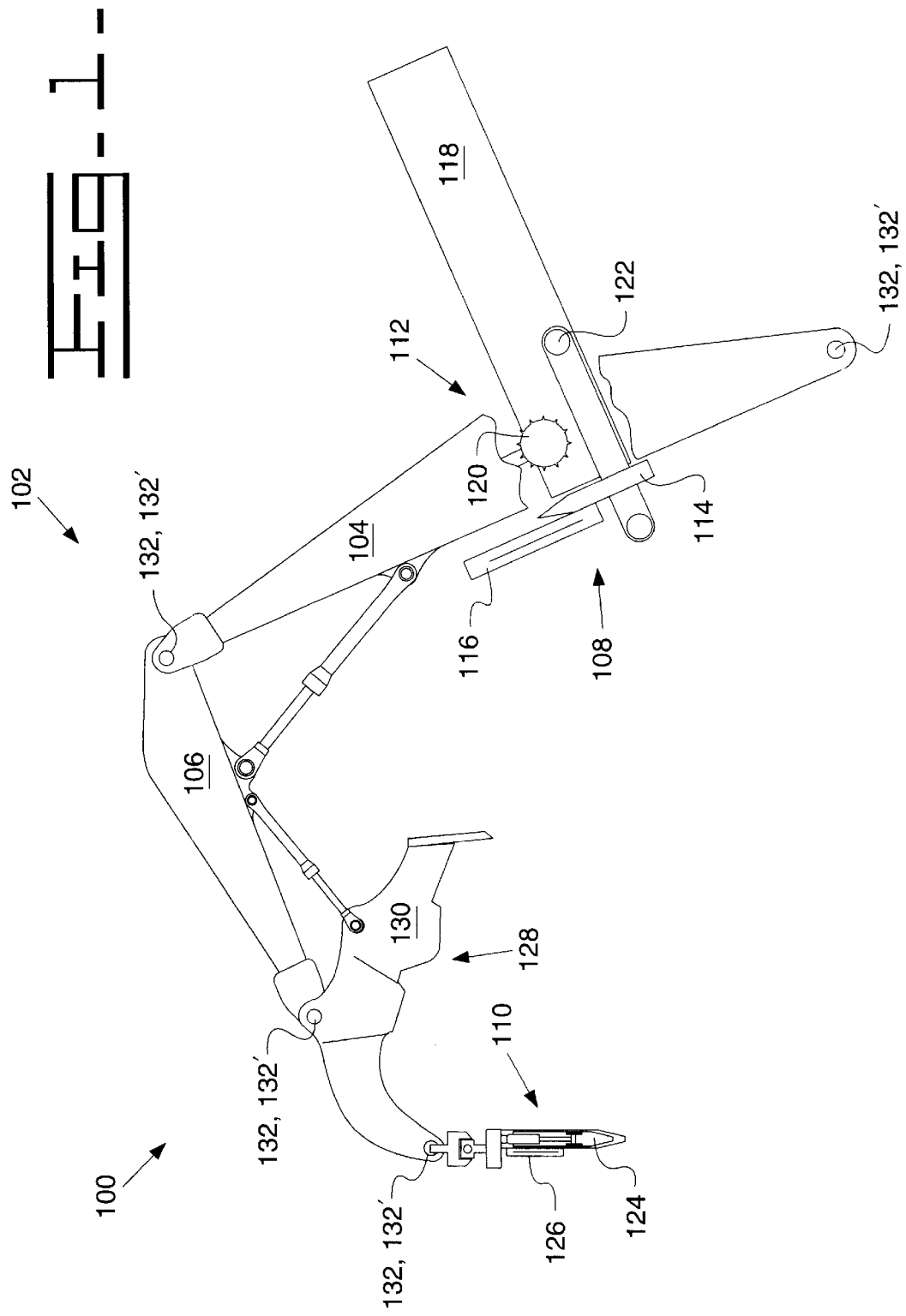
FIG. 1 is a side view of the apparatus of a preferred embodiment of the present invention.

Referring to FIG. 1, a log processing apparatus 100 is provided. The apparatus 100 has a linkage 102. The linkage 102 includes a boom 104 and a stick 106. The boom 104 is attachable to a support platform (not shown). The stick 106 is connected to the boom 104 for relative movement thereto. The apparatus 100 also includes a delimbing assembly 108 and a loading assembly 110. The delimbing assembly 108 and the loading assembly 110 are each attached to one of the boom 104 and stick 106. Preferably, the delimbing assembly 108 is attached to the boom 104, and the loading assembly 110 is attached to the stick 106.

The delimbing assembly 108 preferably includes a log delimbing support system 112, delimbing knives 114, and a butt saw assembly 116. The log delimbing support system 112 acts to provide support for the log as it is being delimbed. The term "delimbing" is meant to refer to any combination of delimbing and debarking operations herein. A preferred embodiment of the delimbing support system 112 is shown in FIG. 1. This embodiment includes a support trough 118, a hold-down roller 120, and a drive mechanism 122.

The loading assembly 110 preferably includes a grapple 124, a topping saw assembly 126, and a log loading support system 128. The log loading support system 128 acts to provide leverage and support for the log as it is being loaded and may act to steady the log. A preferred embodiment of the log loading support system 128 is shown in FIG. 1. This embodiment includes a commonly used heel assembly 130.

Optionally, the apparatus 100 also includes a log measurement system (not shown). The log measurement system has at least one measurement sensor 132 and produces at least one log measurement signal. This signal indicates one or more of a longitudinal characteristic ("length") or a diametrical characteristic ("girth" or "diameter"), of all or a portion of the log.

In a preferred embodiment of the present invention, shown in FIG. 1, the linkage 102 includes one or more linkage joints 132' at the connections between the various components of the linkage 102, and each linkage sensor 132' includes a measurement sensor 132. The measurement sensors 132 can measure the relative angles of the components of the linkage 102, and, knowing the length of the components, the log measurement system can determine a position in space of the grapple 124, the topping saw assembly 126, the butt saw assembly 116, or any other portion of the apparatus 100. Once the relative position of the components of the apparatus 100 is known, one skilled in the art can determine the length of the log or a portion thereof being processed by the apparatus 100, and thereby accurately cut the log to a desired length or lengths.

The butt saw assembly 116 and the topping saw assembly 126 can be bar saws, disk saws, shears, chainsaws, flails, or any other known means to sever or cut the log in a desirable manner. Each of the butt saw assembly 116 and the topping saw assembly 126 can be mounted at any convenient location on the apparatus 100. The presence of either or both of a butt saw assembly 116 and a topping saw assembly 126 is not required for proper function of the apparatus 100.

Figure 2:
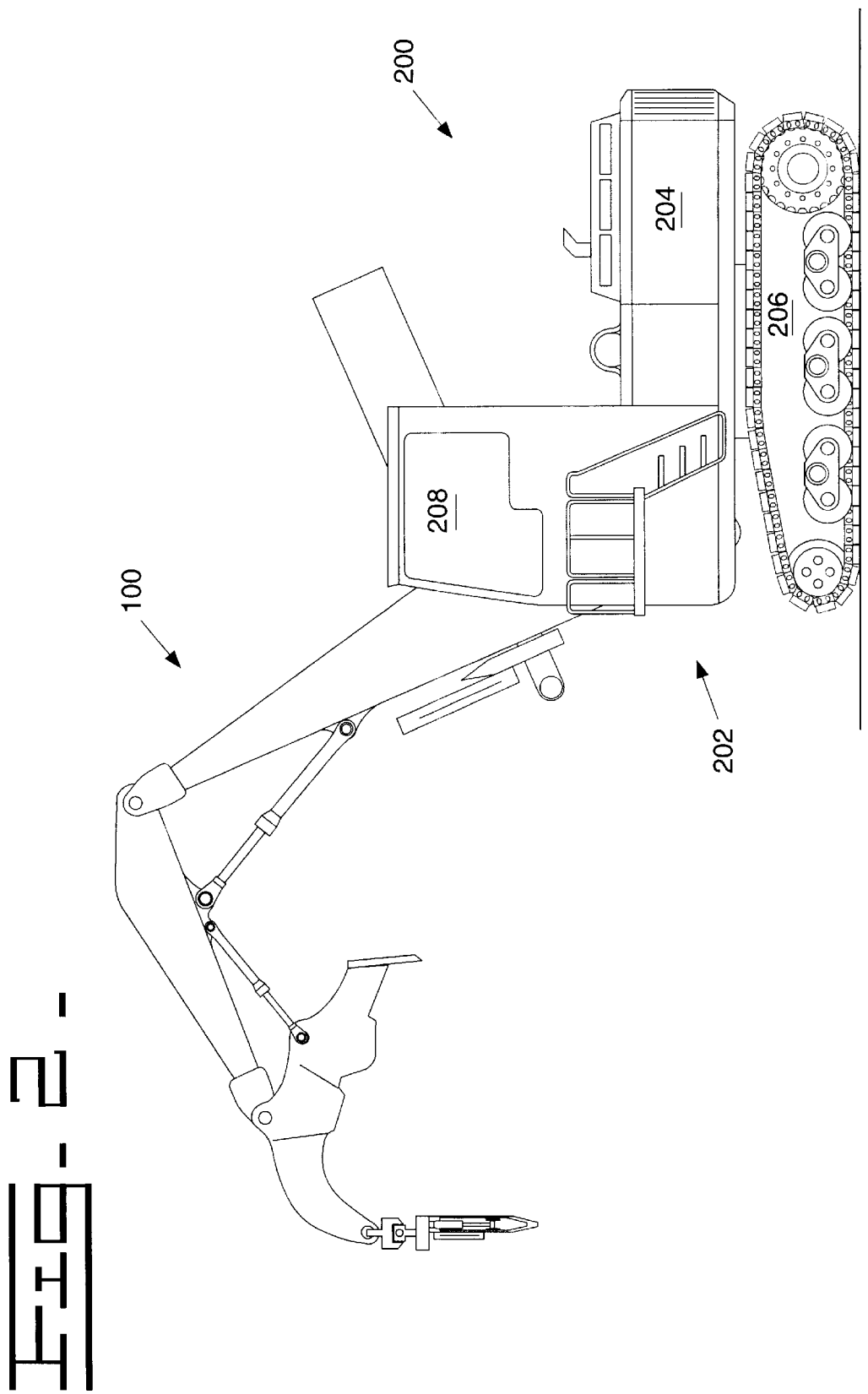
FIG. 2 is a side view of the apparatus mounted on a work machine of a preferred embodiment of the present invention.

Referring now to FIG. 2, the apparatus 100 is shown mounted on a work machine 200. The work machine 200 shown in FIG. 2 is commonly known as an excavator or hydraulic excavator. The work machine 200 includes a body 202, an engine 204, propulsion means 206, an operator compartment 208, and the apparatus 100. In FIG. 2, the work machine 200 acts as a support platform for the apparatus 100, but various other embodiments of a support platform can be envisioned, such as, but not limited to, a stanchion, pier, platform, trailer, footing, and the like.

While aspects of the present invention have been particularly shown and described with reference to the preferred embodiment above, it will be understood by those skilled in the art that various additional embodiments may be contemplated without departing from the spirit and scope of the present invention. For example, the log could have been previously at least partially delimbed, the log measurements could be obtained differently, or the linkage could have more sections in addition to the boom and stick. However, a device or method incorporating such an embodiment should be understood to fall within the scope of the present invention as determined based upon the claims below and any equivalents thereof.

INDUSTRIAL APPLICABILITY

In the following description, the apparatus 100 of the present invention will be assumed to be mounted upon a work machine 200 and located at a central processing/loading location. The apparatus 100 will be referred to as a "processor" 100. These terms are used for convenience of reference and should not be construed to limit the scope of the invention in any way. The following describes the operation of a preferred embodiment of the present invention.

During a logging operation at a forest location, trees are cut by a harvester and the resulting logs are transported to the central processing/loading location by a forwarder. The logs, still carrying-bark and limbs, are unloaded from the forwarder. The processor 100 then picks up each log with its grapple 124 and feeds it into the delimbing assembly 108 in a known manner. The delimbing knives 114 remove the limbs and/or bark from the log as the log is passed between them, either on the intake or output pass of the log. When the log is sufficiently seated in the delimbing assembly 108, either the grapple 124 or a combination of the hold-down roller 120 and a drive mechanism 122 provides motive power to draw the log (intake pass) between the delimbing knives 114 in a direction away from the loading assembly 110 while a support trough 118 serves to support the weight of the length of the log. A motive power is then applied to move the log in a direction toward the loading assembly 110 (output pass). Optionally, a topping saw assembly 126 and/or butt saw assembly 116 may be employed in a known manner, manually or automatically, to remove one or more ends of the log as the tree is being delimbed or loaded.

In the case of a whole-tree operation, once the log is delimbed, it is removed from the delimbing assembly 108 on its output pass by the loading assembly 110 and placed/loaded in a predetermined location by the operator, using the loading assembly 110.

If the log is being processed for a cut-to-length operation, a measurement system may be employed to measure the log's length, partial length, girth, or any other property to determine when a desired portion of the log has passed from the delimbing assembly 108 on the output pass. The delimbed log is removed from the delimbing assembly 108 as above, until a desired length of the log has been removed from the delimbing assembly 108. The topping saw assembly 126 and/or butt saw assembly 116 may then be employed to cut the log at that position, thus producing a child log from the parent log. The child log is then placed into a predetermined location as above and the parent log continues its output pass. This operation may be repeated as needed to produce a desired number of child logs.

The measurement system also may be used to monitor log production, waste generation, or any other properties which may be determined from the log's length, partial length, and girth.

The apparatus and method of certain embodiments of the present invention, when compared with other methods and apparatus, may have the advantages of: successfully and efficiently combining several logging work functions in one apparatus; allowing for logs to be processed in a central location which may be chosen to eliminate spacial constraints; performing several operations without requiring multiple instances of handling/moving the same log; being used in a timely and efficient manner; and being more economical to manufacture and use. Such advantages are particularly worthy of incorporating into the design, manufacture, and operation of forestry machines. In addition, the present invention may provide other advantages that have not yet been discovered.

It should be understood that while a preferred embodiment is described in connection with an excavator, the present invention is readily adaptable to provide similar functions for other work machines. Other aspects, objects, and advantages of the present invention can be obtained from a study of the drawings, the disclosure, and the appended claims.

What is claimed is:

1. An apparatus for processing logs, comprising:
   a linkage, the linkage comprising a boom adapted for attachment to a support platform and a stick connected to the boom;
   a delimbing assembly connected to the boom; and
   a loading assembly connected to the stick.

2. The apparatus of claim 1, wherein the delimbing assembly comprises a log delimbing support system, delimbing knives, and a butt saw assembly and wherein the loading assembly comprises a grapple, a topping saw assembly, and a log loading support system.

3. The apparatus of claim 2, wherein the log delimbing support system comprises a support trough, a hold-down roller, and a drive mechanism and the log loading support system comprises a heel assembly.

4. The apparatus of claim 1, further comprising a log measurement system having at least one measurement sensor and producing at least one log measurement signal.

5. The apparatus of claim 4, wherein the log measurement system produces at least one of a log length measurement signal denoting a longitudinal characteristic of the log or a portion thereof and a log girth measurement signal denoting a diametrical characteristic of the log or a portion thereof.

6. The apparatus of claim 1, wherein the support platform is attached to a work machine.

7. A work machine for processing and loading logs, the work machine comprising:
   a body;
   an engine carried by the body and providing power to the work machine;
   propulsion means connected to the and converting engine power into motion of the work machine;
   an operator compartment connected to the body;
   a linkage connected to the body;
   a log processing assembly connected to at least one of the linkage and the body and having a delimbing portion and a loading portion; and
   wherein the loading portion comprises a grasping means and a steadying means.

8. The work machine of claim 7, wherein the delimbing portion comprises a delimbing motive system and means for delimbing a log.

9. The work machine of claim 8, wherein the delimbing portion further comprises a bar saw.

10. The work-machine of claim 8, wherein the means for delimbing a log is a delimbing knife assembly.

11. The work machine of claim 8, wherein the delimbing motive system comprises at least one of a drive means and a support means.

12. The work machine of claim 11, wherein the drive means is at least one of a grapple or a drive belt and the support means is at least one of a grapple or a support trough.

13. The work machine of claim 7 wherein the loading portion further comprises a bar saw.

14. The work machine of claim 7 wherein the grasping means is a grapple and the steadying means is a heel assembly.

15. The work machine of claim 7, wherein the log processing assembly further comprises a log measurement system having sensors which produce at least one of a log total length measurement, a log portion length measurement, and a log girth measurement.

* * * * *